(12) United States Patent
Panayotopoulos et al.

(10) Patent No.: US 9,021,566 B1
(45) Date of Patent: Apr. 28, 2015

(54) APPARATUS AND METHOD TO SECURELY CONNECT TO AND MANAGE X11 APPLICATIONS ON A REMOTE SYSTEM THROUGH AN HTTP CLIENT

(71) Applicants: Panagiotis Panayotopoulos, San Jose, CA (US); Martin Porcelli, Los Altos, CA (US); Steven Schoch, Sunnyvale, CA (US)

(72) Inventors: Panagiotis Panayotopoulos, San Jose, CA (US); Martin Porcelli, Los Altos, CA (US); Steven Schoch, Sunnyvale, CA (US)

(73) Assignee: Starnet Communications Corporation, Sunnyvale, CA (US)

( * ) Notice: Subject to any disclaimer, the term of this patent is extended or adjusted under 35 U.S.C. 154(b) by 83 days.

(21) Appl. No.: 13/655,788

(22) Filed: Oct. 19, 2012

Related U.S. Application Data

(60) Provisional application No. 61/653,817, filed on May 31, 2012.

(51) Int. Cl.
*G06F 21/00* (2013.01)
*G06F 21/50* (2013.01)
(52) U.S. Cl.
CPC .................................... *G06F 21/50* (2013.01)

(58) Field of Classification Search
USPC ............................. 713/168–174; 726/2–8, 16
See application file for complete search history.

(56) References Cited

U.S. PATENT DOCUMENTS

| 6,088,515 | A | * | 7/2000 | Muir et al. | 709/217 |
| 6,970,167 | B1 | * | 11/2005 | Kumamoto et al. | 345/440 |
| 7,949,677 | B2 | * | 5/2011 | Croft et al. | 707/781 |
| 2003/0065791 | A1 | * | 4/2003 | Garg et al. | 709/229 |
| 2003/0140089 | A1 | * | 7/2003 | Hines et al. | 709/202 |

* cited by examiner

*Primary Examiner* — Josnel Jeudy
(74) *Attorney, Agent, or Firm* — File-EE-Patents.com; Jay A. Chesavage

(57) ABSTRACT

A web server authenticates a user with a web client using a database user table and provides a list of new applications, suspended application sessions, and running application sessions. In response to a request for a new application session, a connection is made from an agent server to an application server hosting the requested application, and connection information including a unique session_ID is added to a database session table such that the client can send a user selection for a session_ID to the web server, which associates the requested session_ID to an existing suspended or running application session using the connection database. For additional security, the client is determined to be trusted or untrusted, and if untrusted, connections to the client are made through a forwarding host, which makes connections to the agent server, and the agent server maintains persistent connections from the agent server to the application server.

27 Claims, 7 Drawing Sheets

Web Browser based X-windows connection manager

*Figure 1*
Web Browser based X-windows connection manager

*Figure 2A*
connection setup

*Figure 2B*
Session Use

Figure 3A
Database — user table
300

| Username | Password Hash | Auth X11 Apps |
|---|---|---|
| user_a | seeded_pw_hash_a | App_A App_B App_C |
| user_b | seeded_pw_hash_b | App_D |
| ⋮ | ⋮ | ⋮ |

Figure 3B
Database — Session Table
340

| Username | Agent Session_ID | Status | Agent-Host |
|---|---|---|---|
| user_a | Session_1 | Running | agent_1 |
| user_a | Session_2 | Suspended | agent_2 |
| user_b | Session_3 | Suspnd/Term | agent_3 |
| ⋮ | ⋮ | ⋮ | ⋮ |

Figure 3C
Database — Application Server Table
360

| App name | Hosted_on |
|---|---|
| App_A | app_host_1; app_host_2; app_host_3 |
| App_B | agent_1; app_host_1; app_host_2 |
| App_C | agent_1; agent_2; agent_3 |
| ⋮ | ⋮ |

Figure 3D
340 Database — Forwarder Table

| Forwarder_ID | Destination (Host, Port, optional Next Forwarder_ID) |
|---|---|
| 50106 | fwd_host_a, 2235, — |
| 1068 | fwd_host_b, 50001, — |

⋮

Figure 3E
360 Message to Client

| Param | Value |
|---|---|
| ID | session_ID |
| cookie | agent security cookie |
| proxy_url | destination client will connect to: (agent or forwarder) |
| proxy_fwd | forward_ID |
| webhub | web server for any additional download components |

⋮

Figure 4
Login Screen

Figure 5
Application Selection/Launch Screen

*Figure 6*
Running App Screenshot

APPARATUS AND METHOD TO SECURELY CONNECT TO AND MANAGE X11 APPLICATIONS ON A REMOTE SYSTEM THROUGH AN HTTP CLIENT

The present invention claims priority of provisional patent application 61/653,817 filed May 31, 2012.

FIELD OF THE INVENTION

The present invention relates to an apparatus and method for making platform-independent secure connections to X-windows applications through an HTTP client. In particular, the invention provides for secure connections which persist during intervals when the HTTP client may disconnect and re-connect from the network from a variety of different networks and browsing clients while maintaining and monitoring the X-windows applications which are running through client connect and disconnect cycles including re-connections using different client devices and browsers.

BACKGROUND OF THE INVENTION

Since the advent of computers there have been a variety of operating systems, each requiring its own software which is generally not compatible with other manufacturer's operating systems, and within a particular operating system, different releases may be provided which allow operation on different central processor units (CPU) and interface device types that create incompatibilities. Some manufacturers such as Apple Computer established their own proprietary operating system. Other manufacturers utilized operating systems such as Microsoft® DOS, Microsoft Windows®, Unix, and Linux, which are capable of operation on a variety of manufacturer's CPU products. Using each of these operating systems from a single user point of access requires communication between the various operating systems and releases, which has long been a challenge in the computer industry. In particular, communicating between the Windows operating systems (Windows computers) and Unix and Linux operating systems (which inherently provides an X-windows interface layer for local and remote connections) has not been simple.

Typical art client-server systems communicate by following a protocol whereby a program may be operative on the server, and the client provides a stream of request data and receives a stream of response data. A typical example is an HTTP server, which receives HTTP request commands, and delivers responses in the form of HTML formatted pages. Another type of client-server system is a remote window system, which imitates the behavior a user would see if running the program on the host computer by using a hardware abstraction layer which synthesizes the behavior of input mouse movements and keyboard strokes as well as synthesizing the behavior of the server display and presenting the pixels from the display abstraction layer to the client display. In this manner, the remote window interface provides an extension of the keyboard and mouse inputs and an extension of the display output. A popular remote window system is the X Window System, also known as X11, or X-Windows, which was developed at the Massachusetts Institute of Technology (MIT) in 1984. X-windows was designed to be used over network connections, and provides a standard open protocol for client server communications that is platform independent. A platform independent approach is desirable to provide a large number of applications which may be present on a small number of application servers to a large number of user clients who may operate on a wide variety of operating systems and client devices.

In the 1980's a communication interface was created to allow a user of a Windows computer to connect to an X-windows System computer and establish an X-window interface on a Microsoft Windows computer where a user can display and manage X-windows applications. The type of software that is loaded onto the computer with the Windows operating system is known as 'PC X Server' software, after which X-windows systems communications with other X-windows interfaces is possible. One requirement of the X-windows software is a persistent remote connection with the client. However, if for any reason that persistent connection is severed, the X-windows session in use is abruptly closed, as no mechanism exists to recover the previous state or resume the lost connection. For many years this technology did not change significantly. In the early 2000's a new communication protocol (not based on the X-windows System) was created that would keep the X-windows application running on the X-windows host system if the connection with the user's workstation was severed for any reason. In order for this to occur, software is required to be installed on both the user's Windows computer and the remote X-windows Systems computer. This client/server type solution is known as "VNC" for "Virtual Network Computing" and it quickly became very popular, particularly in certain industries that worked on complex simulations taking a long time to complete, such as timing simulations, functional simulations, or routing of complex integrated circuits common to the semiconductor industry. Client/Server applications such as VNC have the distinct advantage that the connection can be broken and restored without the termination of the simulation or other application, thereby saving many hours of work.

There are several disadvantages of each of these prior art approaches. While each of the prior art solutions allows for connections between a user's computer to an X-windows host over an Internet connection, these connections have traditionally been a direct connection from the end user's computer to the application host or by way of a connection server which in turn connects to the application host. Additionally, it is required to acquire and perform an installation of the required software. Further, the selection of an X-windows application requires the connecting user be aware of the available alternate X-windows servers which also host the requested application without the ability to know system load levels which is essential for selecting a host which can provide the best performance. Additionally, it is required for the user to have the required X-windows interface software installed on the particular user device. Furthermore, the user may not have sufficient privileges to install in certain locations, such as managed computers, nor control the level of security to compensate for the reduced level of security inherent in the client connection. It is therefore desired to provide an apparatus and method for connecting to and managing remote X-windows System applications using a web browser. It is further desired for the browser to provide status and update information as the remote application progresses, and for the browser connection to be periodically suspended and re-connected, such as is typical for mobile computing. Additionally, it is desired for the security of the connection to be optimized according to metrics derived from the application server and browser.

OBJECTS OF THE INVENTION

A first object of this invention is a HTTP-based connection manager for a remote windows interface having:

a web server pool having at least one web server for accepting incoming connections from a requesting client and issuing a client message with connection information which indicates to the requesting client which agent server or forwarding host should receive a subsequent connection request;

a database user table indicating an association between a user, a password, and available applications;

an optional forwarder table indicating an association between a Forwarder_ID and a particular host, particular port, and optionally a Next_Forwarder_ID;

a database session table indicating an association between a unique session_ID, a username, connection state, and an agent server;

the web server accepting an HTTP connection request including login credentials, and providing a list of running and suspended sessions from the database session table, as well as a list of available applications for new sessions;

an application server having a corresponding application program running for each of the running and suspended sessions identified in the session table;

an agent pool having an agent server connected to an application program of the application server, each said connection identified by a session_ID in the session table;

a forwarding pool having at least one forwarding host which receives a forwarder_ID, thereafter determining from a forwarder database table entry a destination consisting of a host, port, and optional Next forwarder_ID associated with the forwarder_ID;

where a login request by a client is received by the web server, the web server thereafter authenticating the client using the login credentials, the web server thereafter presenting to the client a list of "running" and "suspended" sessions from the database session table, each including a unique session_ID, and also presenting a list of available applications for new sessions;

where a request containing a session_ID from the client to the web server results in the identification of the corresponding session_ID using the database session table, which provides identification of the particular agent server handling the session, and optionally also a forwarder_ID handling the communications such that the communications are routed from the client to the forwarding host, and from the forwarding host to the agent server;

and where a request to resume a suspended session results in the assignment of a forwarder_ID for the particular session, the forwarder_ID identifying a particular host, communications port, and optionally a Next_Forwarder_ID;

where each session is associated with a Session ID, such that the requesting client is able to connect to an agent server, or optionally to a forwarding host, the agent server utilizing the previously established connection to the associated applications server, the client optionally connecting to the forwarding host using a reference to the forwarding host provided by the web server, the forwarding host using the forwarder_ID and the forwarder table;

and where the agent server maintains persistent connections to the applications server for each running and suspended session using an X-windows interface method, each connection utilizing a unique session_ID.

A second object of the invention is a communications system having:

a web server for receiving HTTP requests for running sessions and suspended sessions;

a database having:

a session table indicating an association between a user and at least one session_ID, the session_ID indicating a session status of at least running or suspended, and an agent server;

at least one application server hosting an X11 application;

an agent server for maintaining an active connection to an instance of a running program on an application server for each session_ID of a database sessions table;

where a request to the web server for a particular user results in a list of existing sessions associated with the user, each existing session having a unique session_ID identifying parameters for the connection between the agent server and the application server hosting the running application;

and where a request to the web server for a list of applications results in a list of available applications;

and where a request for a particular running application program by session_ID results in a connection between the agent server and the requester;

and where a request for a particular application program results in the entry of a new session_ID into the database, and the creation of a connection between an agent server and an application server hosting the particular application program.

SUMMARY OF THE INVENTION

The invention provides a user with a computing device that has access to an HTTP client the ability to securely connect to the X-window display interface (or other window display system) of applications running on a remote application server and then manage those applications, including configuration and starting of new instances (sessions) of the applications, and viewing the X-windows application displayed onto their client device. In contrast to the prior art, this invention allows a user to utilize many different devices with access to an HTTP client to display the application, including computers with the Windows operating system, computers with the Linux operating system, Apple Macintosh computers, Apple iPads, or other devices capable of operating with an HTTP client. In contrast to prior art, the invention does not require the user to have pre-installed X-windows connectivity software loaded on the device being used. This provides the user with the convenience of connecting to an X-windows application session from anywhere using any device, as long as it has access to an HTTP client, and interrupting and restarting these sessions without interfering with the application that is running, as well as reconnecting to the application at a later time to examine its progress.

DETAILED DESCRIPTION OF THE INVENTION

Because usage of certain terms in prior art client-server devices may have different meanings than as used in the present description, the inventors believe it useful to clearly define the following terms as used in the present invention description:

A "client" is a user-agent of a requesting host, typically an HTTP or HTTPS user-agent.

An "application server" is a server which provides an X-windows interface to an instance of a program running on the application server.

An "agent server" is a host which maintains an X-Windows connection with a program running on the application server, the X-Windows connection accessible to a client by the specification of the agent server and a TCP port number. The X-Windows connection between agent server and application server is maintained in a database associated with a session_ID which also stores the associated TCP connection parameters. In certain cases where the agent server is capable of hosting an X-Windows application, the agent server may also act as the application server.

A "session" is a reference to the X-Windows connection between the agent server and the application server, identified by a unique session_ID, the details of which connection are saved as a database entry in the "session table". The set of possible states of a session includes "running," "suspended," and any number of transitory states indicating a change to or from "running" or "suspended". "Running" is a session state indicating that a client is connected to an agent server and capable of accessing the session through the agent server. "Suspended" is a session state indicating that no client is currently connected to the session.

A "web server" is any host in a "web server pool" which the client initially connects to when making a query about the status of a session.

A "client message" is a particular response delivered to a client by the web server in response to a client connection request. At a minimum, the client message contains connection details which inform the requesting client as to which particular server to next contact.

A "magic cookie" is a unique identifier used by X-Windows and passed as a parameter in the client message. The "magic cookie" is unrelated to the "web cookie" used in HTTP.

A "forwarding host" is a host in a "forwarding pool" that the client may be directed to connect with instead of an agent server. The forwarding host provides a level of indirection for increased security where it is desired to keep the agent server identity unknown to the client. When a forwarding host is used, the web server passes its identity through the client message, and the forwarding host consults a "forwarder table" to determine the connection details required to communicate with the agent server.

Figure 1:
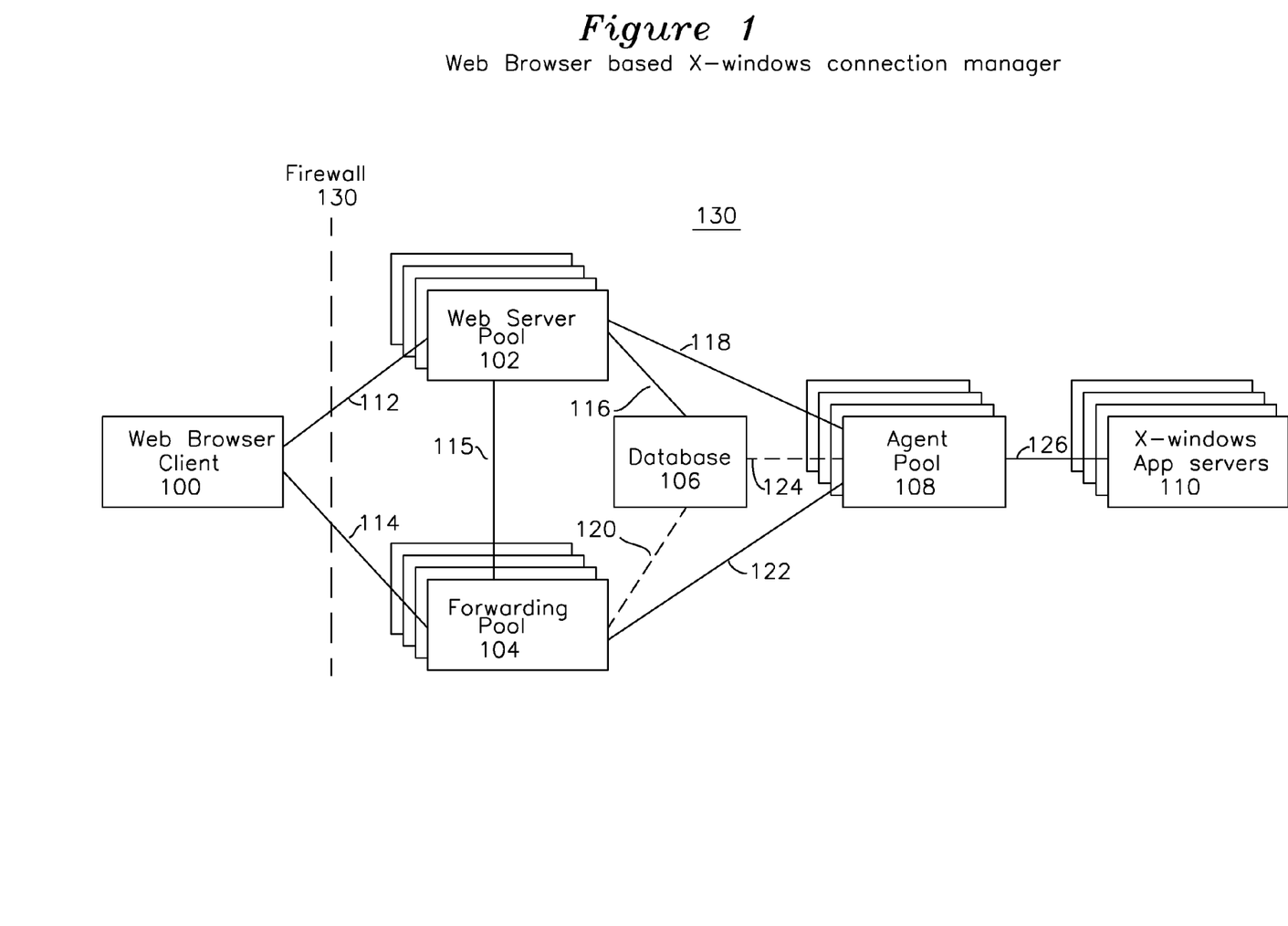
FIG. 1 is a block diagram of the components of a connection manager according to one example of the invention.
Figure 2A:
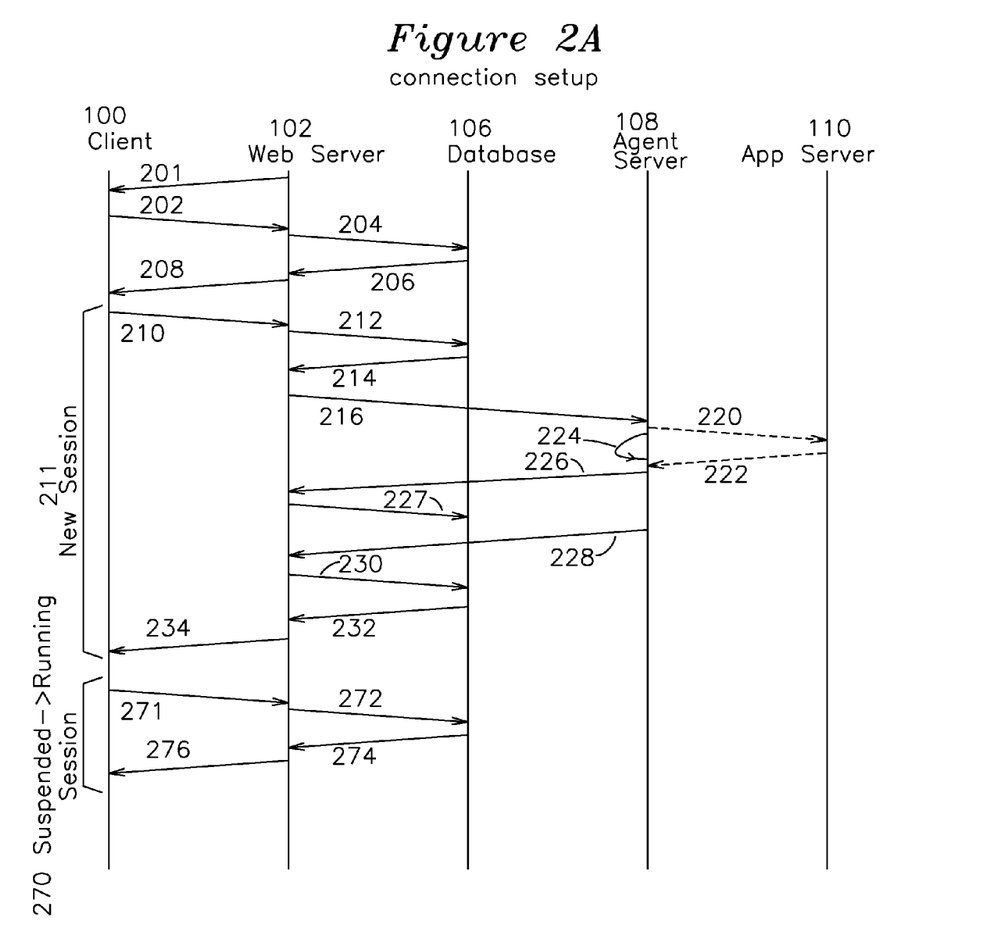
FIGS. 2A and 2B are an example time sequence of the connections made between the components of FIG. 1.
Figure 2B:
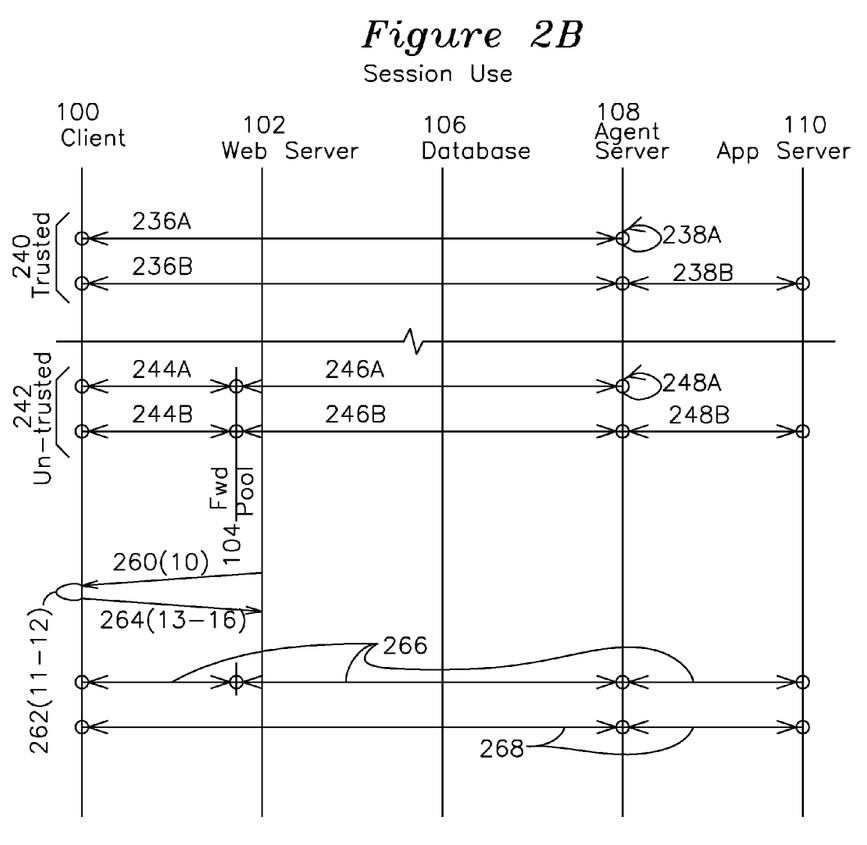

FIG. 1 shows the elements of the connection manager, and is best understood in combination with FIGS. 2A and 2B showing the sequence of events, as will be described.

The connection manager 130 of FIG. 1 includes a Web Server Pool 102 which accepts connections from a client 100, typically through a firewall 130 which provides network address translation (NAT) services to the client 100, and allows only outgoing connection requests initiated by the client 100. In the present example, the client 100 may request data using the Hypertext Transfer Protocol (HTTP) or, more securely, HTTP over Transport Layer Security (TLS), also known as HTTPS and providing client-to-server connection security. Using a secure connection protocol such as HTTPS, the client 100 connects through the firewall 130 to the web server pool 102, which may be a load balanced array of individual web servers as is known in the art of load balancing. It is understood that the client 100 HTTP request is handled by a particular web server in pool 102, and the binding of requests by a particular client is persistent, usually based on client session parameters such as a browser cookie, TCP port, IP address, or other session-specific information which permits binding of a particular web server to a particular client after the initial connection is made. In the current patent application, it is understood that "pool" is used in singular form to indicate that a request is assigned in a load balancing manner to a particular host or server in a "pool", such as in Web server pool 102, forwarding pool 104, agent pool 108, or X11 application servers 110, and that certain of these assignments are persistent, such as connections between agent pool 108 and application servers 110, each connection of which is identified by a session_ID and session status of "running" when a client is accessing the X-windows session through an agent server, or "suspended" when the client is no longer accessing the X-windows session. Once assigned, the agent/application server pairings assigned continue to be used for the life of the session, although it is understood that other methods are possible which perform the required functions. For each of these processing elements present in a "pool", a host assigning element is present, such as a load balancer, which may perform the assignment using any prior art queuing method, including round-robin assignment, least loaded assignment, least number of pending requests, or other metric which provides improved server performance.

Database 106 maintains records for various types of transactions, and may incorporate any database server which can securely handle database requests according to the prior art. FIGS. 3A, 3B, 3C, and 3D describes certain of these database records maintained by database 106, as will be described later. The web server pool 102 receives an HTTP request from the client 100 which includes a username and password, which the web server pool 102 retrieves as a user record 300 of FIG. 3A from database 106 over connection 116. The web server pool 102 authenticates the username and password, and also provides a list of X11 applications available to this particular user, as well as a list of any currently running or suspended sessions using a record from the database table of FIG. 3B, along with the assignment of an agent server which handles the connection to the application server 110. The "username" field of table 3B may be a user identifier which is associated with the username of FIG. 3A. The user then selects one or more of: a new session request associated with launching a new application, running session, or resumes a suspended session accessible through an agent server pool 108 which is persistently connected to the X-windows application on an associated application host 110, or hosted as an application on agent pool 108. If the user selects a new session request for a new application to run, a selection of which hosts are available to run the selected application is made from the list of hosts which support this application, optionally using the database record of FIG. 3C. As indicated earlier, a host which runs a particular X-Windows application can be either an agent server or an application server. Since the agent server is also providing connectivity to a client, it should be understood that the agent server function is distinct from the application server function which may be hosted by an agent server, as the application server and agent server are separate processes, although it may be convenient for both distinct processes to be operative on the agent server.

The primary function of the software running on the servers of agent pool 108 is to provide session continuity for running (in use by a client) and suspended (not in use by a client) sessions between the application server 110 which is running a particular X-Windows software program and a particular agent server in agent pool 108. In this manner, the agent server 108 provides persistent X-windows connectivity to the associated X-windows applications on hosts 110 or 108, which continue to run and can provide periodic status updates to an intermittently connected HTTP client 100 through web server pool 102.

Forwarding pool 104 is used when an additional layer of security is required. The agent pool 108 may be isolated from the client by having the web server 102 direct client connections to the forwarding pool 104. This method of indirection is available because the web server sends a "client message" which contains the host the client may next connect with. The client message connection host is simply a hostname or IP address assigned by the web server, which may be the hostname or IP address of a particular forwarding host in forwarding pool 104 or an agent server in the agent pool 108—this distinction is unknown to the client. If the client connection is directed to a forwarding host in pool 104, a forwarder_ID is provided, which the forwarding host uses in combination with forwarder table 340 of FIG. 3D to resolve to a next host and port, which ultimately leads to a particular agent server, which uses the session_ID of the previously supplied client message to provide connectivity to a particular session of the session table of FIG. 3B. In a preferred embodiment of the invention which reduces the number of different server connections to the database 106, the forwarding pool 104 queries the database 106 to determine the next host via web server pool 102 of FIG. 1, using connections 115 and 116 rather than direct connection 120. The use of the forwarding host and agent server is used to improve security, as it removes direct client access to the application servers 110, and when forwarding hosts are used, conceals the agents 108 which maintain the persistent X-Windows connections to the associated applications servers. As the forwarder database table of FIG. 3D is only accessible by forwarding host pool 104 (or other specifically authorized hosts), and the agent identification is only accessible from forwarder_ID in combination with access to the forward table of FIG. 3D, the web client 100 is unable to identify or access any originating application server hosts or agent server hosts other than the particular forwarding pool host 104 of the instant connection. The web server 102 creates database entries of FIG. 3B using a unique session_ID, and the forwarder table database of FIG. 3D is only accessible by the forwarding host 104. The web server can thereby direct the client to a particular forwarding host 104, and the forwarding host 104 accesses the forwarder table of FIG. 3D (of database 106) to determine which agent server connection to use to achieve connectivity to the application server which is hosting the particular session_ID. Forwarding hosts are used when a client is untrusted, such as from a public network. The web server 102 may use the client IP address as a metric to determine whether the client is untrusted, such as an originating IP address which is associated with a public or foreign internet address, and direct the client 100 to a forwarding host 104 or if the client IP is trusted as being on the same IP subnet as the web server 102, forwarding host 104, agent server 108 or applications server 110, or another trusted IP subnet which is known to the network infrastructure.

Figure 4:
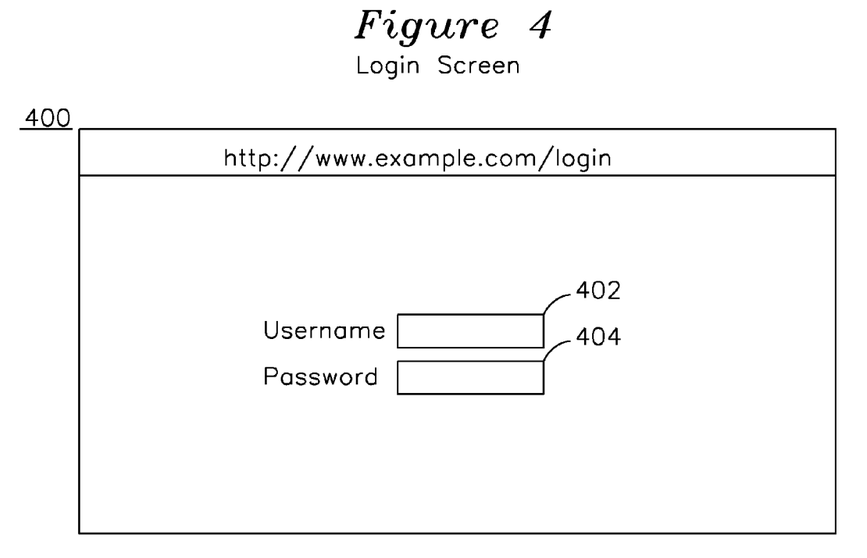
FIG. 4 is an example login screen.

FIGS. 2A and 2B show a time sequence of connection requests and connections made between the various processing elements of FIG. 1, and indicates an example sequence for making persistent connections from a user client to a plurality of X-windows servers, using a web server pool 102 which accepts the client connections, a database 106 which contains user and connection database records, an agent pool 108 for maintaining connections to the X-servers, a pool of applications servers 110 running remote X-windows programs, and as required, an optional forwarding pool 104 for enhanced security. The physical connections between the elements of FIG. 2A are also shown in FIG. 1 for clarity. FIG. 1 112 is used in steps 201, 202, 208, etc of FIG. 2A, and other connections 114, 115, 116, 118, 122, and 126 are used between associated corresponding elements described in FIGS. 2A and 2B. In an example configuration, one method for practicing the invention as shown in FIGS. 2A and 2B contains the following steps:

The web server generates 201 a web page such as the one shown in FIG. 4 with login credentials such as username 402 and password 404, which is delivered to requesting client 100 of FIG. 1. It should be understood that in the present invention "session_ID" is a unique identifier identifying the connection between an applications server and an agent server, and each session_ID is persistent over the life of the session independent of the browser connection or browser type, and is unrelated to any web session Universal Unique IDentifier (UUID) "cookie" which is specific to the particular web browser HTTP connection, or X-windows "magic cookie" which is used within the X11 framework. Additional login credentials may include a private key, a user IP address, a machine hostname, or other session-specific information which is collected during or after the connection 112 setup, and these additional login credentials may be used to restrict login users possessed of specific IP address ranges, private keys, or other criterion. The login information is transmitted 202 to the web server.

The web server uses the login credentials provided in step 202 and connects 204 to a user record in the database (106 of FIG. 1) with the login credentials and verifies the user's name and password. If the credential check with the returned database 106 record 206 is successful, the user is allowed access to the system and is presented various menu options shown in FIG. 5, and the process continues, otherwise an error message web page is served 206, and no further processing occurs.

Figure 3A:
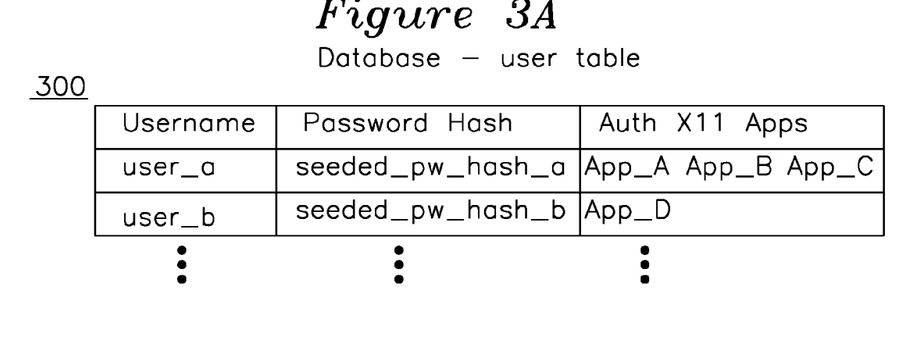
FIGS. 3A, 3B, 3C, 3D, and 3E show example database tables.
Figure 3B:
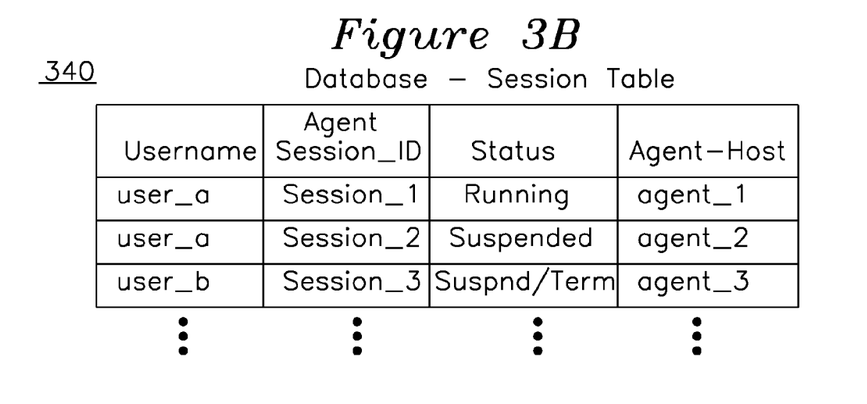
Figure 3C:
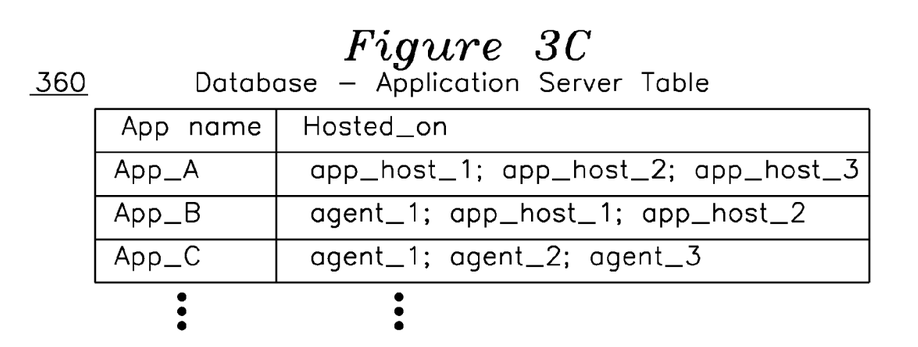
Figure 3D:
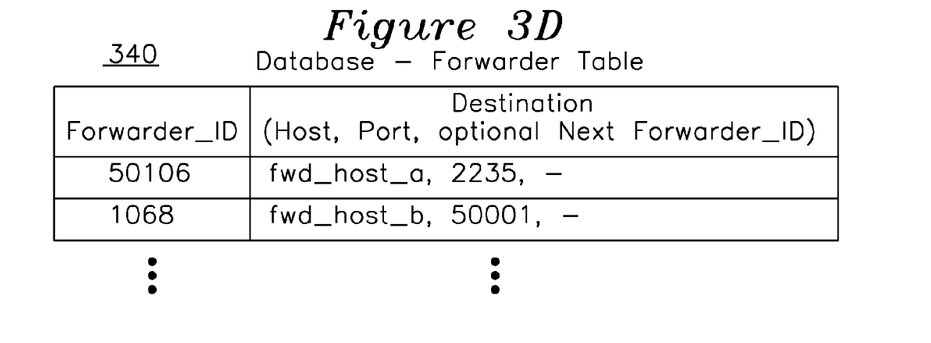
Figure 3E:
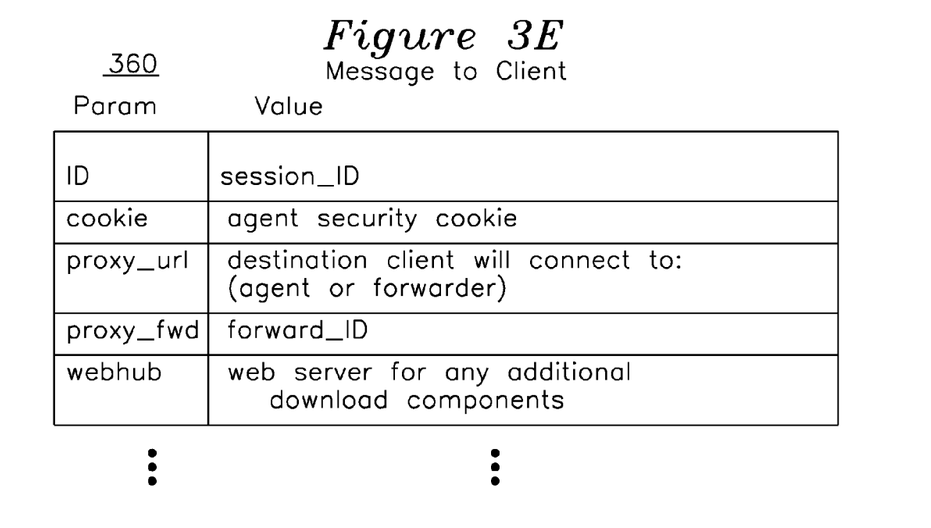
Figure 5:
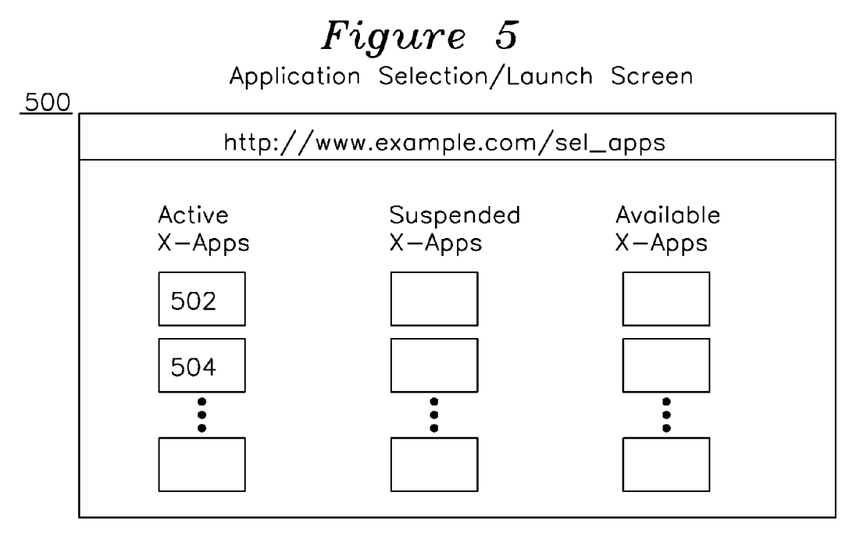
FIG. 5 is an example X-windows application selection and launch screen.
Figure 6:
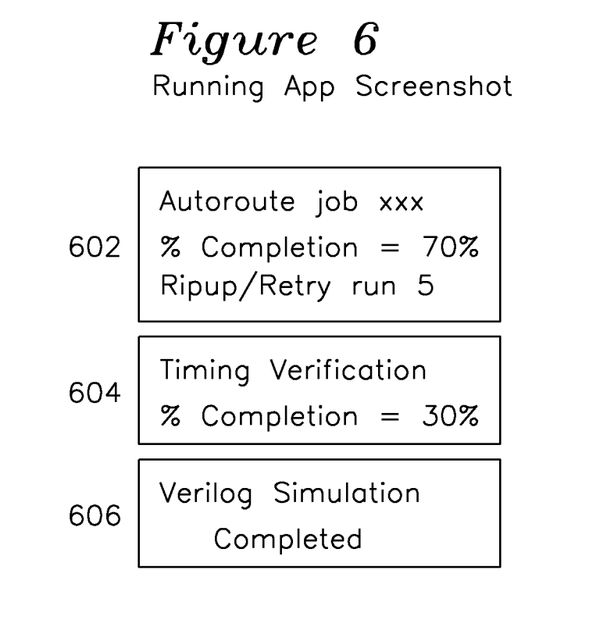
FIG. 6 is an example X-windows status window which shows current time-stamped views of each X-windows application.

For successful login, step 208 presents the FIG. 5 list of currently running (connected) application sessions, suspended (disconnected) application sessions, as well as new applications available for a particular user to launch a new session, and this list may be generated by the web server 102 using the database table contents shown in FIGS. 3A, 3B, and 3C. In one embodiment of the invention, the list of available X-windows applications for a user database entry of FIG. 3A are provided on a per-user basis, where the user has access to applications listed in FIG. 3 which are provided by an administrator or automated configuration engine (not shown).

Request step 210 occurs when the user responds to the presented selection items of FIG. 5 and selects a particular one of the presented X-windows applications, and request 210 initiates a launch of that application as will be described in the subsequent steps. The request 210 may include the resumption of a previously suspended session, a currently running session, or the selection of a new X-windows application to be executed.

New session steps 211 include steps 210, 212, 214, 216, 220, 224, 226, 227, 228, 230, and 232 correspond to the client selection of a new session (one not previously present in the session table of FIG. 3B) from the list of possible new applications presented. When the user makes a selection for a new application in step 210, database request 212 searches for a list of suitable hosts from the agent pool and/or X-Application pool 110 for servicing the X-windows application request. Database record 360 of FIG. 3C indicates one such method of identifying application servers for a particular requested application, which agent server is selected and is provided in response 214. Alternatively, the web server may select from a list of possible X-windows servers, load levels, and hosted applications and further select a particular server based on load metrics, which may include number of outstanding requests, round robin queue assignment, least number of current requests, or other metric which provides the best performance for the requester.

Using the metrics previously described for new application selection, in step 216 the web server selects an agent server 108 to launch the selected application and issues the launch request to the selected agent server.

The assigned agent server 108 which receives the request of step 216 further decides to either handle the X-window request locally on an agent server 108 which also hosts applications in the pool, as shown in step 224, or the request is directed to the application server pool of step 220 with acknowledgement 222. In this manner, the agent server 108 creates a "back-end" connection to the application server shown as 224 or 220/222 to handle X-windows data which may be handled either locally (step 224) or via a remote application server 110 (steps 220/222). A new session entry in table of FIG. 3B is created with a unique session_ID assigned, an agent server 108 is selected, and the session table database record of FIG. 3B is updated for the user, session_ID, by selected agent server 108 in steps 226 and 227 for the X-windows process. In a preferred embodiment, where the forwarding pool 104 and agent pool 108 do not have communications access to the database 106 (shown as connections 120 and 124, respectively), step 226 provides communication of the session parameters from the agent 108 to the web server 102, which communicates them to the database 106, and in an alternative embodiment, step 226 provides for the agent server 108 to update database 106 directly (using dashed connection 124 of FIG. 1). Completion of the connection setup is communicated to the web server by step 228 or by the web server communicating directly with the database to detect the new session in steps 230/232. From the collected connection parameters of the new session, the web server 102 then presents to the client 100 the required connection parameters in a client message 234, as was described earlier, and for a trusted connection, the client is directed to the agent server 108 in trusted connection steps 240. For the case of the agent server hosting the application, the client 102 thereafter connects directly to the agent server 108 as shown in steps 236A with the agent server also running the application as a separate process in step 238A, or for the case of an application server hosting the application, the client 102 connects to the agent server 108 in step 236B with the agent server utilizing previously established connection 238B to application server 110. The session is now in a "running" state, and communications between the client 100 and agent server 108 continue for as long as the "running" state is maintained.

The untrusted connection steps 242 are similar to those previously described, but the client message sent in step 234 directs the client 100 to connect with a forwarding host 104 which is provided a forwarder_ID, and the forwarding host 104 uses this forwarder_ID in conjunction with the database forwarder table of FIG. 3D to connect with the agent server 108, with client connection 244A connecting to forwarding host 104, which uses connection 246A with agent-hosted application 248A. Similar to the previous case, if the application host is from pool 110, the client connection 244B is directed by the client message to forwarding host in pool 104, which uses the forwarder_ID to connect with agent server 108, which uses the session identifying the pre-existing connection from agent server 108 to application server 110.

The case of a "suspended" session which becomes "running" is shown in FIG. 2A steps 270, where the selection 271 is for a "suspended session", which results in a database lookup 272, modification of database state from "suspended" to "running", return of session parameters 274, which are delivered 276 to the client as a client message. The client message may contain a reference to forwarding hosts 104, or directly to an agent server 108, and the pre-existing session_ID which was associated with the selected suspended session is used to identify the associated connection from agent server 108 and application server 110, using any of the combinations of trusted/untrusted, application server hosted or agent server hosted variations, as was previously described in connections 240 and 242.

In alternative embodiments, the updating of the database with session_ID information may be done by any server possessed of the required database connection entry information. The associated agent server process thereafter opens the assigned TCP port or any required connection parameters and uses these parameters to reach the assigned application server (or agent server running an application) in subsequent communications with the client 100.

Returning to the handling of "trusted" versus "untrusted" connection types, and using the new session 211 example, the database session table of FIG. 3B had been updated in step 226 with the new X-windows application session_ID, username, and agent server information, and the X-windows application has an opened connection to the agent server handling the client request, each parameter required for a connection from the client to X-windows server associated by session_ID as contained in client message 234 with either a forwarding host 104 or a direct connection to the agent server 108. The selection of returning the address for a forwarding host or an agent server depends on how "trusted" the connection to the client may be. Various methods are available to determine the "trustworthiness" of the connection from the agent server 108 to the client 100. In one method, if the agent server 108 and client 100 are on the same network subnet, or the client connection is on a virtual private network (VPN), the connection is "trusted". If the connection to the client 100 is directed to an IP address which is outside the data center which may be hosting the web server 102, database 106, agent server 108, and X-windows applications servers 110, the connection metric may indicate "untrusted".

The objective of the agent server 108 is to maintain a connection to the X-windows process step 238A apart from the client connection process 236A which may terminate or change connections or switch to different end client 100 or associated browser. In another embodiment where the X-windows application is hosted on the X-windows server pool, step 236B indicates the connection to the agent server as before, with the agent server making a connection to the application server pool in step 238B. As in process step 238A, the agent server 108 serves to provide a persistent connection to the X-windows application, either step 238A hosted locally on the agent server 108, or step 238B where the application is hosted on the application server 110. If the client is "untrusted", such as a client having an IP address outside the subnet of the data center which hosts the application server pool 110, agent server pool 108, or database 106, then forwarding pool 104 is introduced, which provides an additional layer of security. In this case, web server database update step 230 provides entries into the database 106 indicating a forwarding path by which the client 100 connects to the agent server 108 though a series of one or more forwarding hosts 104.

For an agent hosted X-windows process 248A or application server hosted process 248B, step 234 includes sending a client message to the client 100 which directs the client to connect with the forwarding host and includes the session_ID and a unique forwarder_ID. As a practical matter, the client message only identifies the next server to be contacted, a session ID, and optionally a forwarder_ID, and it is indeterminate to the client whether it is being directed to a forwarding host or to an agent server. If the client connects with an agent server, the session_ID is used connect the client to the pre-existing session, and if the client connects with a forwarding host, the forwarding host uses the forwarding_ID to identify the agent server to connect with, and the session_ID is used to select the particular session, which identifies an agent host and port number for use. In either scenario, the client is able to connect directly or indirectly to the handling agent server, thereby coupling the requests from the client to the X-windows process running locally 248A, or on an application server 248B, as before.

At this point, connections have been made from the client 100 to a specific agent server 108 which provides a persistent connection to X-windows server 110, but no actual X-windows communications have yet occurred between client and x-server, as it has not yet been established whether the client has or can support an X-server connection. Many different methods of performing these steps are possible, but in one example, step 260 provides that the web server 102 builds a small download file for each session request for the client 100 which contains a launcher script and information necessary to connect to the session on the agent server 108, optionally through a forwarder 104. The download file may also include a proxy for connection to the agent server, a relay, and/or an X11 server, or these components may be downloaded automatically by the launcher, if not already installed. In other embodiments that do not support the downloading of a file (such as an iPad or Android operating system), the user is directed to a link which may be an application program which enables operation of the device, for example a tablet computer such as an iPad or handheld communications device such as an android cellular phone or tablet, or reader device such as a Kindle. As each of these devices requires a different type of launcher, the example provided herein is for understanding of the invention, and is not intended to limit the scope to the particular described embodiment. The relay component, if present, handles non-X-windows commands, such as forwarding authentication and print requests, and the launcher runs the other two programs and provides any parameters they require, such as agent hostname or forwarding host hostname and connection ID assigned by the web server.

In step 262, the client executes the self-extracting file, which extracts and calls the launcher with parameters that tell the client how to connect 264 to the agent server, and also includes the verification key.

After the X-windows server software is either determined to be present, or is freshly downloaded on the client device, the X-windows software is launched and the launcher program will wait for the X-windows software to be ready to accept connections.

When the client device's X-windows client software is ready to accept connections, the launcher will launch the proxy and relay programs, which will connect to the particular agent server 108 identified in the self-extracting file parameters. If a forwarding host 104 is being used, these programs will be given the host name of the forwarding host 104, shown as 266 for the untrusted client with remote application server. If a forwarding host is not being used as in the trusted connection 240 of FIG. 2B, the proxy and relay components of the client 100 will be given the name of the agent server 108 and the X-windows communications operate as shown in 268.

When the client 100 uses the X-windows program, the X-windows uses the proxy, which connects to the designated agent server 108, and the agent server 108 allows the client to see and manage the remote application session in an application window.

In this manner, the self-extracting file provides only the connection information of the web server 102 and agent server 108, and the agent server 108 uses connection identification by session_ID of the connection record in database 106 and accessed by agent server 108 to keep the identity of internal application server 110 concealed while providing access for X-windows applications, and the self-extracting file which is generated and delivered on a per-session basis allows the operation of X-windows on any client device 100. In this manner, users may access and manage the remote application as well as any running or suspended sessions through almost any computing device from anywhere, and with a high level of mobility and client transparency. In addition, security is significantly enhanced from the prior art. Furthermore, the inherent security of the system allows a system administrator to have much more control over the application sessions, providing specific users access to certain applications and a much easier time of curtailing abuse of the system.

We claim:

1. A secure connection server connecting a client to an application server through an agent server, the connection server having:
   a database, the database having:
   a user table containing associations between username and password;
   a session table containing a unique session_ID, session status, associated user identifier, and associated agent server;
   a web server for authenticating a user, thereafter presenting a list of session states derived from said session table;
   a hosting server for hosting authorized applications, the hosting server being either an application server or an agent server;
   the web server establishing a connection from the agent server to the hosting server, thereafter updating the session table with an identification of the particular agent server handling the session and a unique session_ID, as well as any additional information required to subsequently use the session;
   where the web server, after completion of a connection to an application server by the agent server, provides the client with a client message containing the associated session_ID, a server to contact, and an optional forwarder_ID;
   such that when said server to contact is a forwarding host, the forwarder_ID is used in combination with a forwarder table to identify a next server to contact, each forwarding host having an associated forwarder_ID stored in a database and providing a connection to the agent server associated with said session_ID;
   where a connection from said application server to said agent server associated with at least one said session_ID carries at least one of:
   display information from said application server; keyboard information to said application server; or mouse or pointer information to said application server;
   where said forwarding host is not identified to said client or said application server until after said client authentication is completed;

where at least one of said database, said web server, said hosting server, or said agent server is operative on a computer;

and where, for each said session_ID in said session table, said hosting server and said agent server maintain an associated persistent connection after said client is disconnected.

2. The secure connection server of claim 1 where the application server has an executing application for each session_ID, the agent server has a corresponding connection to each executing application, and the list of available applications correspond to applications available on either the agent server, or the application server.

3. The secure connection server of claim 1 where the database further contains a list of applications which are available on either an agent server or an application server.

4. The secure connection server of claim 1 where the web server provides a self-extracting file which provides the client with a connection to an agent server and a session_ID, the session_ID identifying a pre-existing connection between an agent server and the application server.

5. The secure connection server of claim 1 where the agent server handling a particular session_ID for a client is identified by at least one of: an HTTP parameter by the web server, a hostname provided by the web server, or by the contents of a downloadable self-extracting file provided by the web server for a particular session_ID.

6. The secure connection server of claim 1 where the session_ID parameters which identify the agent server and session as stored in the session database are an agent server hostname or agent server IP address and a TCP port.

7. The secure connection server of claim 1 where the application server is either an agent server in an agent pool or an application server in an application server pool.

8. The secure connection server of claim 1 where the client accesses the application server through the agent server using a protocol where the application host generates pixel display information to the client, and the client provides mouse and keyboard input to the application server.

9. The secure connection server of claim 8 where the remote window communication protocol is compatible with X-windows or X11.

10. The secure connection server of claim 1 where the web server makes a determination as to whether the client connection is trusted or untrusted, and the connection from client to agent server includes a forwarding host when the client connection is untrusted.

11. The secure connection server of claim 10 where the client is trusted if it is on same subnet as at least one of: the web server, the database, the agent server, or the application server, and the client is untrusted if it is on a different subnet.

12. The secure connection server of claim 1 where the web server is selected from a pool of web servers.

13. The secure connection server of claim 1 where the agent is selected from a pool of available agents.

14. The secure connection server of claim 1 where the application server is selected from a pool of available application servers.

15. A secure connection server with optional agent server concealment for connecting a client to an application server through an agent server, the connection server operative on a computer and having: a database, the database having:

a user table containing associations between username, password, and optionally authorized applications; a session table containing associations between a unique session_ID, a username, a session status, and an agent server associated with the session;

an application server table containing a list of available applications;

a web server for authenticating a user, thereafter presenting a list of session derived from the session table and associated with a username;

an application server hosting the authorized applications; a forwarding host;

an agent server which, upon request from the web server, makes a connection from the agent server to the application server, thereafter updates the session table with the agent server identifier handling the connection and a unique session_ID, as well as any additional information required to subsequently use the session;

where the web server, after establishing a session between an application server and an agent server, provides the client with a client message containing a contact server, the previously assigned session_ID, and an optional forwarder_ID;

the contact server being either a forwarding host which uses the optional forwarder_ID in combination with a database table to identify an agent server, or the contact server being the agent server, the agent server using the session_ID to identify a session between the agent server and an application server, the agent server thereby providing connectivity between the application server and the agent server;

where at least one particular session in said session table is associated with an executing program of said application server, the executing program for connection to a client associated with said particular session, said particular session between said application server and said agent server persisting after a client disconnects from said agent server;

where a particular said forwarding host is identified to said client after said authentication and also after the selection of a particular one of said sessions from said client;

where at least one of said database, said web server, said application server, said hosting server, or said agent server is operative on a computer;

and where at least one said session conveys at least one of:
said application server transmitting display information to said agent server;
said application server receiving keyboard information from said agent server;
said application server receiving mouse or pointer information from said agent server.

16. The secure connection server of claim 15 where the application server has executing applications for each session_ID, the agent server has a corresponding connection to each executing application, and the list of available applications correspond to applications available on either the agent server, or the application server.

17. The secure connection server of claim 15 where the database application server table contains a list of applications which are available on either an agent server or an application server.

18. The secure connection server of claim 15 where the web server provides a client message including a self-extracting file which provides the client with identifier to a forwarding host and a session_ID, the session_ID identifying a pre-existing connection between an agent server and the application server.

19. The secure connection server of claim 15 where the forwarding host determines the agent server associated with a particular connection by issuing a query to the database session table using the session_ID.

20. The secure connection server of claim 15 where the parameters required for the agent server to communicate with the applications server are communicated to the forwarding host using an agent hostname or agent IP address and a session_ID, the forwarding host subsequently using the session_ID and a query to the database to resolve to a specific agent server connection to the application server.

21. The secure connection server of claim 15 where the application server is either an agent server in an agent pool or an application server in an application server pool.

22. The secure connection server of claim 15 where the client accesses the application through the forwarding pool and through the agent server using a remote window communication protocol where the application host generates pixel display information to the client, and the client provides mouse and keyboard input to the application server.

23. The secure connection server of claim 22 where the remote window communication protocol is X-windows.

24. The secure connection server of claim 15 where the web server is selected from a pool of web servers.

25. The secure connection server of claim 15 where the agent server is selected from a pool of available agents.

26. The secure connection server of claim 15 where the forwarding host is selected from a pool of forwarding hosts.

27. The secure connection server of claim 15 where the application server is selected from a pool of available application servers.

* * * * *